United States Patent [19]

Boehm et al.

[11] Patent Number: 4,729,287

[45] Date of Patent: Mar. 8, 1988

[54] VACUUM-OPERATED BRAKE POWER BOOSTER HAVING DIAPHRAGM EDGE BEAD RETENTION MEMBER

[75] Inventors: Peter Boehm, Frankfurt am Main; Wilfried Wagner, Huettenberg-Weidenhausen; Gilbert Bischoff, Hattersheim; Karl Breitwieser, Reinheim, all of Fed. Rep. of Germany

[73] Assignee: Alfred Teves GmbH, Frankfurt am Main, Fed. Rep. of Germany

[21] Appl. No.: 917,727

[22] Filed: Oct. 10, 1986

[30] Foreign Application Priority Data

Oct. 19, 1985 [DE] Fed. Rep. of Germany ....... 3537237

[51] Int. Cl.$^4$ .................... F15B 9/10; F16J 3/02
[52] U.S. Cl. ..................... 91/369 A; 91/376 R; 92/98 D; 92/99
[58] Field of Search ............... 60/553, 554; 91/369 R, 91/369 A, 376 R; 92/98 R, 98 D, 99

[56] References Cited

U.S. PATENT DOCUMENTS

| 3,754,450 | 8/1973 | Putt et al. ........................ 91/369 A |
| 4,043,251 | 8/1977 | Ohmi ................................. 91/376 R |
| 4,399,735 | 8/1983 | Katagiri et al. .................. 91/369 A |
| 4,400,942 | 8/1983 | Reinartz et al. .................. 91/376 R |
| 4,538,503 | 9/1985 | Hachiro ............................ 91/369 A |
| 4,586,427 | 5/1986 | Thiel ................................ 91/369 A |
| 4,641,568 | 2/1987 | Boehm et al. .................... 91/369 A |

FOREIGN PATENT DOCUMENTS

| 1957898 | 6/1977 | Fed. Rep. of Germany . |
| 2819466 | 11/1978 | Fed. Rep. of Germany ......... 92/99 |
| 3411027 | 9/1985 | Fed. Rep. of Germany . |
| 2557527 | 7/1985 | France .............................. 91/376 R |
| 2116270 | 9/1983 | United Kingdom ............. 91/369 A |

Primary Examiner—George L. Walton
Attorney, Agent, or Firm—James B. Raden; Robert P. Seitter

[57] ABSTRACT

A vacuum operated brake power booster including a retaining member for securing the edge bead of a moveable wall diaphragm of the booster to the booster control valve is disclosed. The booster includes a casing subdivided into two chambers by a moveable wall having a diaphragm which has an internal edge bead disposed in an annular groove in the control valve housing of the booster. An annular retention ring surrounds the bead of the diaphragm to the outside of the bead and radially retains the edge bead within the control valve housing groove.

8 Claims, 4 Drawing Figures

VACUUM-OPERATED BRAKE POWER BOOSTER HAVING DIAPHRAGM EDGE BEAD RETENTION MEMBER

BACKGROUND OF THE INVENTION

The present invention relates to a vacuum-operated brake power booster of the type including a movable wall which is sealed relative to the vacuum housing and which is formed by a diaphragm plate and a rolling diaphragm which is, in part, abutted against the diaphragm plate. The booster also includes a piston rod coupled to a brake pedal for the actuation of a control valve connecting one chamber of the brake power booster either with a vacuum or with a higher pressure differential. A control valve piston is axially displaceable within a control valve housing and acts through the intermediary of an interposed reaction element on the end of a push rod. The rolling diaphragm sealingly engages around the control valve housing and is clamped in a peripheral groove of the control valve housing through the intermediary of an edge bead.

In known brake power boosters of the type to which the present invention relates there is, under certain circumstances, a danger of a detachment of the rolling diaphragm from the control valve housing at the edge bead which contributes to considerable degradation of functional safety of the brake booster. This danger occurs, in particular, as a result of blocked pressure in the booster caused by an actuation of the booster without a vacuum and/or with closed non-return valve outlets as well as by the introduction of a pressure above atmospheric during engine misfires. A force component acting in a radial direction is generated in these situations due to the pressure prevailing in the brake power booster housing, which force component causes the annular bead of the rolling diaphragm to detach from the peripheral groove in the control valve housing in which it is received.

SUMMARY OF THE INVENTION

It is, therefore, an object of the present invention to eliminate the shortcoming described above by providing for a vacuum-operated brake power booster structure which maintains the specific advantageous features and operational characteristics of the prior art type booster while providing for increased safety of operation.

According to the invention, a diaphragm retaining element is nondisplaceably arranged on the control valve housing, the retaining element moving together with the movable wall in a longitudinal direction of the vacuum-operated brake power booster when the brakes are operated. In order to ensure a firm hold of the edge bead of the rolling diaphragm in the radial direction of the vacuum-operated brake power booster, the retaining element includes two rings. Advantageously, the two rings are coaxially arranged at a distance from each other and are interconnected by means of webs running axially, the radially inner surface of the first ring abutting on the radially outer surface of the edge bead and/or being arranged at a distance form the radially outer surface of the edge bead.

According to an important feature of the invention, slits formed between the webs ensure a functionally adequated bleeding of the device.

According to another feature of the invention, in order to ensure that the retaining element is firmly seated on the control valve housing, the second of the two rings is provided with at least two oppositely directed projections extending radially inwardly and being shaped in the form of a segment of a circle, the retaining element being arranged on the control valve housing in a plane which is located vertically to the longitudinal direction of the housing and runs through air feed channels extending radially. The projections snap into the channels and secure the retaining element against axial displacement.

A particularly advantageous feature of the present invention provides for an air filter and/or damping element, preferably a polyurethane foam ring, at the retaining element with the webs running axially and forming a substantially annular ring shaped surface which serves as an abutting surface for the air filter and/or damping element.

BRIEF DESCRIPTION OF THE DRAWING

The present invention will be better understood after a reading of the following Detailed Description in conjunction with the accompanying drawings wherein.

DETAILED DESCRIPTION OF THE PREFERRED EMBODIMENT

Figure 1:
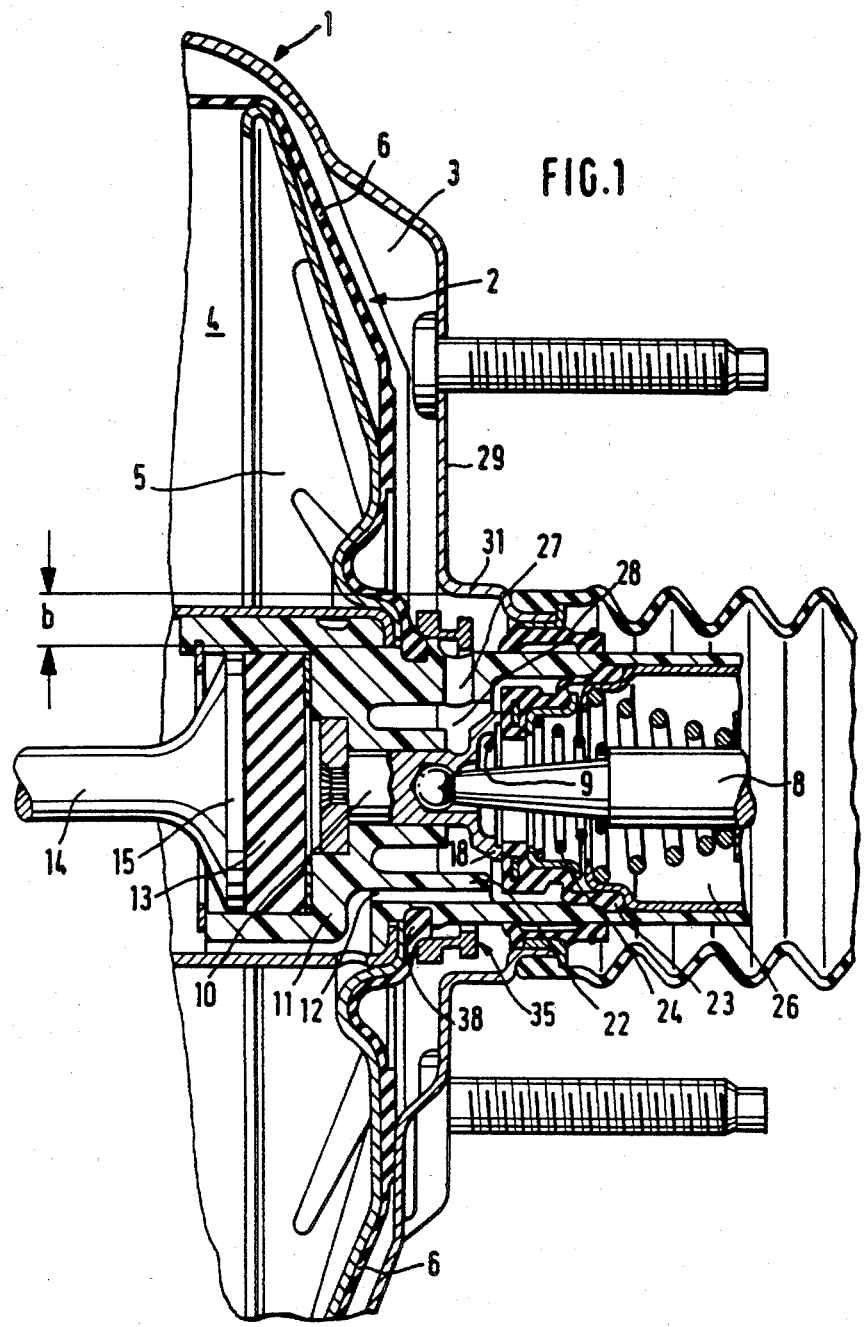
FIG. 1 is a partial longitudinal cross-section through a vacuum-operated brake power booster equipped with the retaining element according to the invention showing details of construction.
Figure 2:
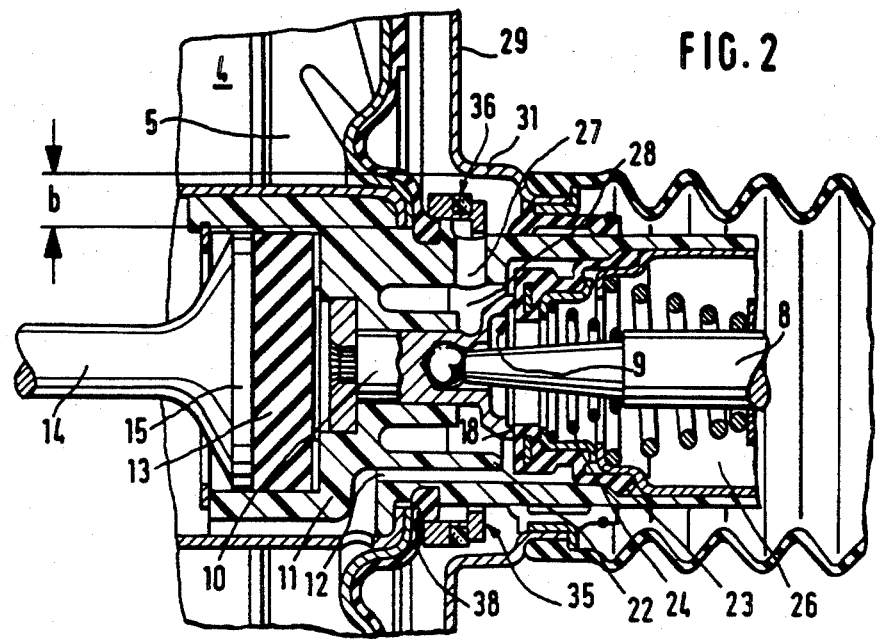
FIG. 2 is a partial longitudinal cross-section of the booster of FIG. 1 showing details of construction of a retaining element including a clamping element.

A brake power booster is shown in FIGS. 1 and 2 and includes a vacuum housing 1 which is sub-divided by an axially movable wall 2 into a working chamber 3 and a vacuum chamber 4. The axially movable wall 2 includes a diaphragm plate 5 made from deep-drawn sheet metal and a flexible diaphragm 6 abutting thereon. The diaphragm forms a rolling diaphragm and defines a seal between the outer circumference of the diaphragm plate 5 and the vacuum housing 1, only a portion of which is shown in the drawings.

A control valve 9 actuatable by a piston rod 8 is provided with a control valve piston 10 connected to the piston rod 8, which valve piston releases valve openings in a control valve housing 11 in manner such that the working chamber 3 is, in the depicted inoperative position of FIG. 1, connected to the vacuum chamber 4. Connection of the working chamber to the vacuum chamber is through the intermediary of air feed channels 12 running laterally inside the control valve housing 11 which discharge onto the face of a poppet valve 23 at the circumference of the control valve housing 11. On actuating the control valve 9, that is, when the piston rod 8 is displaced axially, communication between the vacuum chamber 4 and the working chamber 3 is interrupted and the working chamber 3 is connected to the atmosphere so that the movable wall is caused to move toward the vacuum chamber 4.

The brake power is transmitted by way of a rubber-elastic reaction disc 13 seated in an indentation on the face of the control valve housing 11 and a push rod 14 provided with a flanged head 15 onto an actuating piston of a master cylinder (which is not depicted) of the brake system. The master cylinder is arranged at the vacuum side end of the brake power booster.

A pressure spring (not depicted in the drawing) bearing against the front wall of the vacuum housing 1 on the vacuum side of the booster and on a flange, maintains the movable wall 2 in the depicted initial at rest brake released position.

On actuation of the braking pedal, the piston rod 8 and the valve piston 10 are moved to the left, in opposition to the force of a spring 24. The spring 24 of the poppet valve 23 thereby urges the valve to the left onto the seat 22 in the control valve housing 11, and the air feed channel 12 is closed. In the course of further movement, the seat 18 at the valve piston 10 moves away from the poppet valve 23, and the outside air passage 26 is opened. At that point atmospheric air may flow through the outside air passage 26 in the control valve housing 11 toward the right hand side of the valve piston 10 and the vacuum in the working chamber 3 is thereby reduced. The force generated due to the pressure differential existing on the right and on the left hand side of the movable wall 2 displaces the wall to the left in opposition to the force of the pressure spring, and displaces the push rod 14 and the piston in the master cylinder. The pressure which is built up in the master cylinder exerts a reaction force on the reaction disc 13 by way of the piston and the push rod 14. The reaction pressure is also transmitted onto the valve piston 10, the latter thus being displayed to the right, whereupon the seat 18 sealing engages with the poppet valve 23. In doing so, the air feed channel 12 and the outside air passage 26 are closed. The valve piston 10 has now assumed its so-called "alert" position.

In the maximum braking position, the outside air passage is constantly open so that the maximum pressure differential, and thus the maximum boosting pressure, is available at the movable wall 2. The runout pressure of the booster has thus been reached. A further increase in the master cylinder pressure can only be achieved by an additional force applied on the piston rod 8. On releasing the braking pedal completely, the valve piston 10 returns to its initial position, the outside air passage 26 is closed and the vacuum passages 12, 27, 28 are opened. Due to the vacuum balance at the movable wall 2 resulting therefrom, a force is no longer exerted on the wall and the force of the spring arranged in the brake booster housing 1 is sufficient to urge the movable wall 2 back to its inoperative position. The piston of the master cylinder then also returns to its inoperative position.

If a blocked pressure is built up in the vacuum chamber 4, such as, for example, when the brake booster is operated without a vacuum or with vacuum passages 12, 27, 28 closed a component of force acting in a radial direction of the brake power booster is being generated. Due to the effect of this radial force, the rolling diaphragm 6, which has its edge bead 38 clamped in a peripheral groove of the control valve housing 11, can be detached from the groove as a result of which the brake booster will become inoperative.

In order to prevent the rolling diaphragm 6 from detaching from or slipping out of the peripheral groove of the control valve housing 11, a retaining element 35 is provided which is arranged in an annular chamber b defined by the surface of the control valve housing 11 and a neck portion 31 of the rear vacuum housing shell 29. The retainer secures the edge bead 38 of the rolling diaphragm 6 against the dislodging effect of the radial force.

As shown in FIGS. 1 and 2, the control valve housing 11 is provided with an air feed channel 27 extending transversely to the longitudinal axis of the booster, which channel connects the valve chamber 28 behind the control valve 9 with the working chamber 3 and through which channel outside air flows on actuation of the braking pedal. The retaining element 35 is axially nondisplaceably held on the control valve housing 11 in this air feed channel 27.

As can be seen in FIG. 2, the retaining element 35 can preferably serve, at the same time, as a support for an air filter and/or damping element 36, whose function is principally to reduce noises occurring during the rapid inflow of outside air into the working chamber 3 due to high flow rates. The damping element 36 can advantageously be formed by means of a polyurethane foam ring which has a damping effect on the outside air flowing at a high rate into the working chamber 3 so that the air is forced to spread out in front of the polyurethane foam ring and to flow through the latter at low rate.

Figure 3:
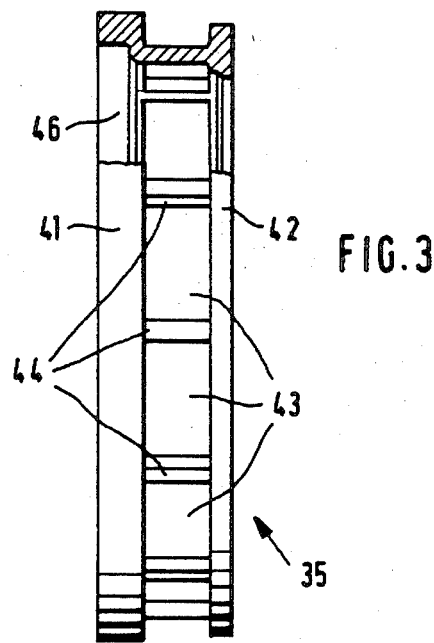
FIG. 3 is a partial cross-sectional view of a retaining element for radially securing the edge bead of the rolling diaphragm in the booster of FIGS. 1 and 2.

The retaining element 35 shown in FIG. 3 includes a first ring 41 as well as a second ring 42, both rings 41, 42 being co-axially arranged at an axial distance from each other and being connected with each other by means of a plurality of webs 43 extending axially between the two rings 41, 42. Slits 44 are formed between the individual webs 43 and permit bleeding of the brake booster, which bleeding is required for proper functioning of the booster.

Figure 4:
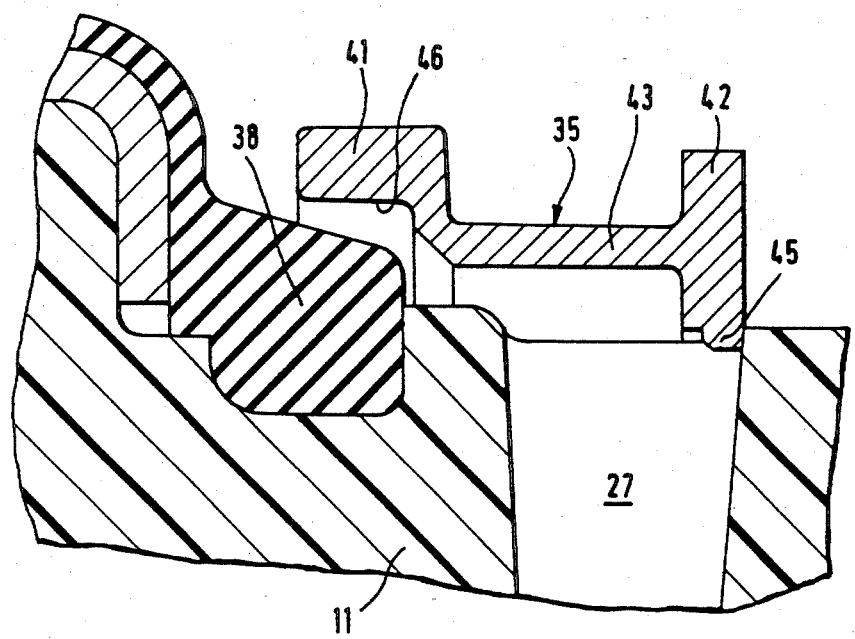
FIG. 4 is an enlarged partial cross sectional view of the retaining element shown installed in the booster according to FIG. 1.

FIG. 4 shows the retaining element 35 according to invention installed in the vacuum housing 1 of the vacuum-operated brake power booster. This retaining ring includes two opposite projections 45 being shaped in the form of a segment of a circle and being provided on the radially inner surface of the second ring 42. When the retaining element 35 is installed, the projections 45 snap into the air feed channels 27 extending radially in the control valve housing 11 and bear against the wall of the air feed channels 27. The arrangement illustrated in the drawing shows a slight distance between the surface of the edge bead 38 and the radially inner surface 46 of the first ring 41, however it is, of course, also possible to dimension the first ring 41 so as to abut directly with its radially inner surface 46 on the edge bead 38 of the rolling diaphragm 6.

What is claimed is:

1. A vacuum-operated brake power booster comprising, a movable wall sealed relative to a vacuum housing, said wall defined by a diaphragm plate and a rolling diaphragm on said diaphragm plate, a piston rod adapted to be coupled to a brake pedal, and operatively connected to a control valve, said control valve connecting a first chamber of the brake power booster alternately to either a vacuum or to a higher pressure differential, said control valve including a control valve piston which is axially displaceable within a control valve housing and which acts through the intermediary of an interposed reaction element on the end of a master cylinder push rod, said rolling diaphragm including an edge bead sealingly engaged around the control valve housing in a peripheral groove in the control valve housing, a retaining element arranged in an annular chamber formed by a cylindrical surface of the control valve housing and a neck portion of the vacuum housing, said retaining element including a first ring surrounding the edge bead of the rolling diaphragm and lockingly securing the edge bead in said groove against the effect of a radial force on said edge bead, said retaining element being nondisplaceably affixed on the control valve housing and including a second ring coaxially arranged at a distance from said first ring, said first ring and said second ring being interconnected by a plurality of axially extending webs forming a plurality of bleed passages aligned with a vacuum passage of said control valve for bleeding the brake booster.

2. The vacuum-operated brake power booster according to claim 1 wherein a radially inner surface of the first ring abuts on a radially outer surface of the edge bead.

3. The vacuum-operated brake power booster according to claim 1 wherein a radially inner surface of the first ring is arranged a distance from a radially outer surface of the edge bead.

4. The vacuum-operated brake power booster according to claim 1 wherein the second ring includes at least two oppositely directed projections extending radially inwardly and being shaped in the form of a segment of a circle.

5. The vacuum-operated brake power booster according to claim 4, wherein the retaining element is arranged on the control valve housing in a plane lying perpendicular to a longitudinal direction of the housing, said projections received in radial air feed channels and retain said retaining element against an axial displacement said air feed channels communicating air to the diaphragm through said control valve.

6. The vacuum-operated brake power booster according to claim 1 wherein the webs running axially form a substantially annular surface which serves as an abutting surface for an air filter element.

7. The vacuum operated brake power booster according to claim 1 wherein the webs running axially form a substantially annular surface which serves as an abutting surface for a damping element.

8. A vacuum-operated brake power booster comprising, a movable wall sealed relative to a vacuum housing, said wall defined by a diaphragm plate and a rolling diaphragm on said diaphragm plate, a piston rod adapted to be coupled to a brake pedal, and operatively connected to a control valve, said control valve connecting a first chamber of the brake power booster alternately to either a vacuum or to a higher pressure differential, said control valve including a control valve piston which is axially displaceable within a control valve housing and which acts through the intermediary of an interposed reaction element on the end of a master cylinder push rod, said rolling diaphragm including an edge bead sealingly engaged around the control valve housing in a peripheral groove in the control valve housing, a retaining element arranged in an annular chamber formed by a cylindrical surface of the control valve housing and a neck portion of the vacuum housing, said retaining element including a first ring surrounding the edge bead of the rolling diaphragm and lockingly securing the edge bead in said groove against the effect of a radial force on said edge bead, said retaining element being nondisplaceably affixed on the control valve housing and including a second ring coaxially arranged at a distance from said first ring, said first ring and said second ring being interconnected by a plurality of axially extending webs forming a plurality of bleed passages aligned with a vacuum passage of said control valve for bleeding the brake booster, an air filter provided on an external peripheral portion of the retaining element between said first and second rings and coaxial to said axially extending webs for reducing noises occurring during the rapid inflow of outside air to said first chamber.

* * * * *